United States Patent [19]

Bays

[11] Patent Number: 6,164,399

[45] Date of Patent: Dec. 26, 2000

[54] TRACK-TYPE CARRIAGE SYSTEM FOR HEAVY VEHICLES

[75] Inventor: Marvin G. Bays, Ponca City, Okla.

[73] Assignee: Sercel, Inc., Houston, Tex.

[21] Appl. No.: 09/324,272

[22] Filed: Jun. 2, 1999

[51] Int. Cl.$^7$ .................................................. B62D 55/112
[52] U.S. Cl. ........................... 180/9.5; 180/9.21; 305/120
[58] Field of Search ...................... 180/9.21, 9.5, 180/9.52, 9.54; 305/120, 121, 129, 132, 134; 280/105, 43.17, 43.22, 28.5

[56] References Cited

U.S. PATENT DOCUMENTS

| | | | |
|---|---|---|---|
| 3,938,605 | 2/1976 | Koch .......................................... | 180/9.5 |
| 4,429,898 | 2/1984 | Bedenbender et al. . | |
| 4,496,015 | 1/1985 | Porter, Jr. et al. ...................... | 180/9.26 |
| 4,949,800 | 8/1990 | Virly ....................................... | 180/9.21 |

OTHER PUBLICATIONS

Brochure on Foremost Nodwell 320 Vibrocarrier. Foremost Industries, Inc., Alberta, Canada, Jun. 1994, (2 pgs).
Brochure on Omnitrac LLC. Omnitrac, LLC,La Grande, Oregon, Sep. 1998, (8 pgs).
Brochure on Challenger 35 & 45 Agricultural Tractors. CAT Ag Products, Caterpillar Inc., 1994, (4 pgs).
Brochure on 8000/8000T Series, 160– to 225–HP Tractors on Tires or Tracks. John Deere, 1998, (32 pgs).
Internet printout on QUADTRAC® Tractors. Case Corp., Jan. 1999, (10 pgs).
Article on Machinery Today. *Farm Journal,* Nov. 1996, p. 41.
Brochure on PC27 Tracked Vibrator. Sercel, Inc., Houston, Texas, May 1998, (4 pgs).
Article on Market Watch. *Construction Equipment,* Apr. 1996, pp. 34 and 84.
Brochure on CAT Mobil–trac Systems. Caterpillar Industrial Products, Inc., Peoria, Illinois, 1993, (15 pgs).
Brochure on Claas. Claas of America, Inc., Columbus, Indiana, Apr. 1990, (2 pgs).
Brochure on Mattracks System. National Transmission Track Division, Thief River Falls, Minnesota, 1994, (5 pgs).

*Primary Examiner*—Kevin Hurley
*Attorney, Agent, or Firm*—Fellers, Snider, Blankenship, Bailey & Tippens, P.C.

[57] ABSTRACT

The present invention provides a track-type carriage system for heavy vehicles, and, in the preferred embodiment, a track-type carriage system for an articulated steering seismic vibrator vehicle. The carriage system consists of four track modules, two fore and two aft, each independently mounted at one end of a heavy axle and bearing a proportionate share of the vehicle weight as applied to the track module via a ground pressure cylinder. Each track module includes an S-shaped frame interrelating a large drive wheel mounted to the axle, a pair of forwardly mounted idler wheels and a plurality of mid-wheels. A stabilizing mechanism manages torsional and lateral forces and also accommodates for fore and aft movement of the track module frame.

20 Claims, 9 Drawing Sheets

TRACK-TYPE CARRIAGE SYSTEM FOR HEAVY VEHICLES

BACKGROUND OF THE INVENTION

1. Field of the Invention

This invention relates generally to carriage systems for heavy vehicles, and, more specifically, to track modules for use in connection with articulated steering tracked vehicles, the track module having a novel stabilizing mechanism to manage large torsional and horizontal forces induced upon the track module frame. In one aspect, the present invention provides an improved carriage assembly for an "articulated vibrator" vehicle used for generating acoustic energy for seismic exploration systems.

2. Background

Vehicles having a substantially rigid main frame supported and moved by two long track assemblies, one disposed along each opposing side of the frame, have heretofore been used as off-road vehicles for traveling over rough terrain. While the development of such vehicles has been the subject of inventive work and research, the prior art vehicles have not found wide acceptance for use as seismic vibrator vehicles for several reasons. Conventional tracked vehicles are generally very slow of speed and, therefore, difficult to move over long distances. These dual-track vehicles commonly use steel grouser bars in the tracks which cause damage to hard-surfaced roads, thereby limiting the vehicle to off-road operation only. Moreover, vehicles with long dual tracks "pitch over" upon the cresting of a hill or rise. The shock due to pitching makes the operation of the vehicle relatively uncomfortable for the driver-operator and can result in damage, not only to the vehicle itself, but also to the expensive seismic exploration apparatus mounted on the vehicle. Because of the remoteness of the areas in which seismic exploration vehicles are employed, breakdowns are extremely costly. Because of these problems, rigid frame dual track seismic exploration vehicles are not favored in the industry.

Yet a tracked vehicle, if it did not possess the aforementioned disadvantages, would clearly rate above seismic exploration vehicles having a tire and wheel carriage system. Because the gross weight of a typical seismic vibrator is about 65,000 pounds, supported on four tires each having a footprint of about 620 in.$^2$, the ground pressure under each footprint averages around 26 psi and peaks at the tire center at around 40 psi (the typical pressure of the tire). When operating in sand hills, such as in the deep desert where blown sand may pile up to 1000 feet high, vehicles having a tire and wheel under-carriage system are prone to bury, especially when attempting to traverse a grade. Consequently, heavy seismic vibrator vehicles with excessive ground pressure (>10 psi) cannot negotiate many sand mountains where they need to go. The heavy footprint of these vehicles is also a disadvantage in deep snow and delicate tundra encountered in arctic regions. A track-type under-carriage system would have a much lighter footprint and would be able to more easily navigate rough terrain without damaging the environment. Also, because tracked vehicles do not utilize pneumatic tires, no "down-time" would be encountered due to flat tires.

Thus, a need exists for a new and improved modular carriage system, especially of the articulated steering 4-track type, for seismic vibrator vehicles. For obvious reasons, it also would be beneficial for the modular carriage system to be capable of retro-fit onto existing seismic vibrator vehicles having only two axles.

After-market retro-fit modular track-type carriage systems for vehicles in general are known. Existing configurations fall into two basic categories. The most common type is the "triangular track configuration" which uses an elevated, relatively small diameter drive wheel. This triangular-shaped track module attaches to one end of a single driving axle. The second type uses a large diameter drive wheel which clones the radius of the original tire and wheel assembly. This second type track module has the advantage of using the same axle ratio as the original tire-equipped unit, and, therefore, retains the speed and gradability of the original machine. This assembly also attaches to one end of a single driving axle on a vehicle with an articulated frame.

Existing single axle track carriage systems, however, are not capable of handling the heavy loading and high axle torque generated by large vehicles, such as heavy seismic vibrator vehicles. Such heavy vehicles with modular track carriage systems also generate high torsional and horizontal (lateral) loads which are incapable of being managed by existing track module geometries. In addition, if a track module carriage system is to be used in a large, off-road vehicle, such as a seismic vibrator, the track module should have the capability to vertically oscillate so that the full footprint of the track remains in contact with the ground, even over very rough terrain. Present systems lack this high oscillating capability.

Thus, for a 4-track carriage system to be successfully implemented in the field of heavy vehicles it must possess a structural geometry to withstand heavy loading and high axle torque and include a mechanism to control the large torsional and horizontal dynamic loads induced onto the track module frame. To function as a seismic exploration vehicle it must also be smooth running (at speeds up to 20 miles per hour) and capable of navigating hills and obstacles without significant pitching. A system achieving these objectives would be a valuable advancement in heavy, off-road vehicle design.

SUMMARY OF THE INVENTION

The present invention provides a track-type carriage system for heavy vehicles, and, in the preferred embodiment, a track-type carriage system for an articulated steering seismic vibrator vehicle. The carriage system consists of four track modules, two fore and two aft, each independently mounted at one end of a heavy axle and bearing a proportionate share of the vehicle weight as applied to the track module via a ground pressure cylinder.

Each track module includes an S-shaped frame interrelating a large drive wheel mounted to the axle, a pair of forwardly mounted idler wheels and a plurality of mid-wheels. A rubber track belt circumscribes the wheels while a track tension cylinder operating between the module frame and the idler wheels keeps the track appropriately tensioned. The track module frame is pivotably connected by a rear frame bearing to the vehicle axle so that the frame, idler wheels and mid-wheels may vertically oscillate. Consequently, the vehicle maintains traction and a large track footprint over rough terrain and easily transitions over hills and obstacles. For a cost-effective vehicle, the track module system should reduce the average ground pressure to about 7.5 psi without compromising the vehicle's ground clearance, speed or gradability.

As each track module is subject to dynamic loads of up to 22,000 pounds, tremendous destabilizing forces are encountered during operation. A large torsional moment is induced upon the track module frame by the offset between the track module centerline and the centerline of the rear frame bearing. The track module frame also encounters considerable destabilizing lateral forces induced by track/ground friction during turning of the vehicle. These forces, if left unmanaged, would quickly collapse the track module. Indeed, the difficulty in managing such forces has been the primary obstacle in the development of industry acceptable 4-track vehicles. Force management is further complicated by the desired vertical oscillation of the track module frame, which causes a slight fore and aft movement of structural components due to pivoting of the track module frame at the rear frame bearing. Any type of stabilizing mechanism designed to withstand the aforementioned torsional and lateral forces must also be able to accommodate the fore and aft movement of the track module frame. Because of the large forces involved, this presents a serious engineering challenge, especially with respect to roller assemblies which are desirable to manage vertical oscillation of related components but are not tolerant of side loading which causes skidding of the rollers.

The present invention solves the problem of force management through a novel stabilizer assembly consisting of an elongate housing vertically mounted at its top end to the vehicle frame forward of the ground pressure cylinder. An outwardly extending arm is slidably received in the housing and is connected at two points to the track module frame. The outermost point of connection is along the centerline of the module. In the preferred embodiment, the arm is a roller arm provided with cam followers which run in hardened races within the housing. The housing is anchored against lateral movement by a tie rod which is connected at one end to the back side of the housing and at the other end to the opposite side of the vehicle frame. Importantly, each point of connection between the stabilizer assembly and the track module and vehicle frames is established with a spherical-type bearing. This gives the stabilizer mechanism a degree of forgiveness to permit the housing to move in a pendulum-like fashion. Since the housing is pivotably connected at its top end to the vehicle frame by a spherical bearing but is not rigidly affixed at its bottom end, though it is laterally restrained by a tie rod, its bottom end is free to move fore and aft in concert with the track module frame. As such, no significant axial forces are induced on the cam followers. This prevents binding or skidding of the cam followers against the hardened races of the housing, in turn preventing breakdowns and resulting in a longer usable life for these components.

A better understanding of the present invention, its several aspects, and its objects and advantages will become apparent to those skilled in the art from the following detailed description, taken in conjunction with the attached drawings, wherein there is shown and described the preferred embodiment of the invention, simply by way of illustration of the best mode contemplated for carrying out the invention.

DETAILED DESCRIPTION OF THE PREFERRED EMBODIMENT

Figure 1:
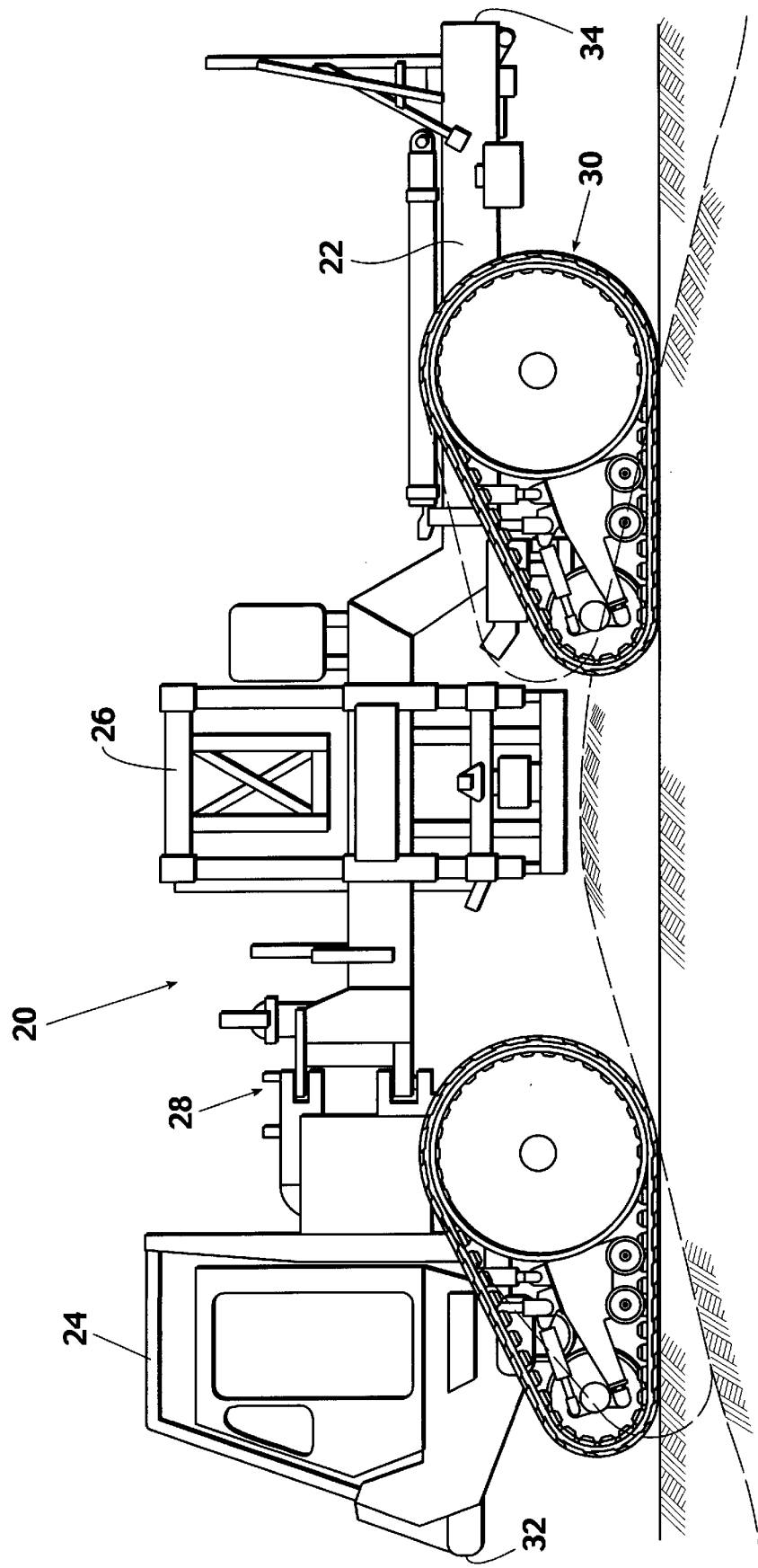
FIG. 1 is a side view of a seismic exploration vehicle employing the inventive carriage system.
Figure 2:
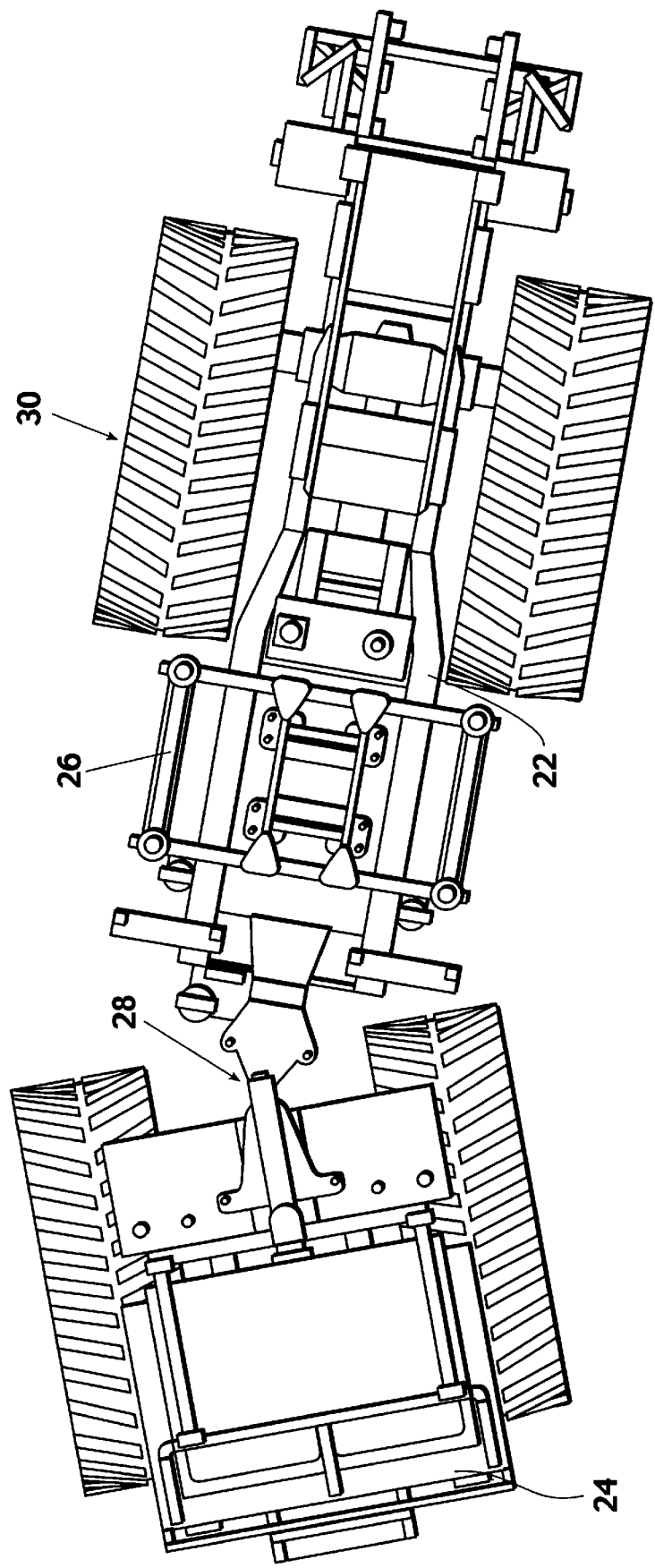
FIG. 2 is a top view of the seismic exploration vehicle shown in FIG. 1.
Figure 3:
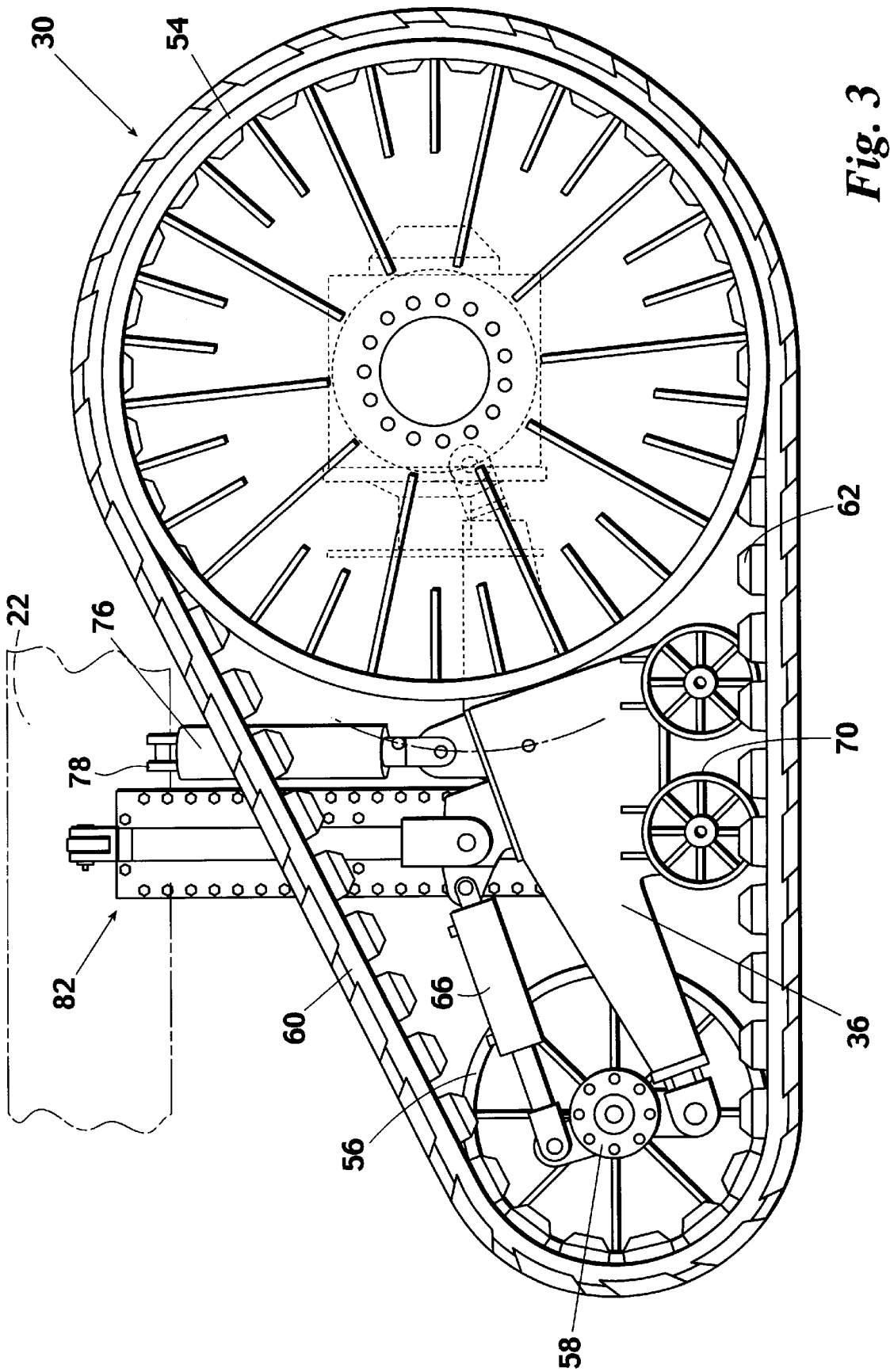
FIG. 3 is a side view of the inventive carriage system.

Referring now to the drawings, wherein like reference numerals designate identical or corresponding parts throughout the several views, and initially to FIGS. 1 and 2, there is shown a seismic exploration vehicle 20 which, in general, comprises a vehicle frame 22 upon which is supported a cab 24 and seismic exploration apparatus 26. The illustrated vehicle 20 is exemplary of a conventional seismic exploration vehicle (except with respect to its carriage assembly) the construction of which is well known in the art. Large seismic exploration vehicles are typically hinged (articulated) at a frame pivot point, as indicated by the reference numeral 28, to allow vehicle steering.

The seismic exploration vehicle shown in the drawings is provided with the inventive carriage system. More specifically, four track modules 30, two fore and two aft, are mounted to the vehicle 20. The construction of the track modules 30 and the interrelation of the track module structure to the structure of the vehicle 20 is shown more particularly in FIGS. 3–6, to which your attention is now directed. For purposes of orientation and description, the forward or fore end of the vehicle 20 or of components thereof should be taken to mean the end farthest toward the front 32 of the vehicle 20, while, in like manner, the end farthest toward the back 34 of the vehicle 20 may be described as the rear or aft end.

Figure 4:
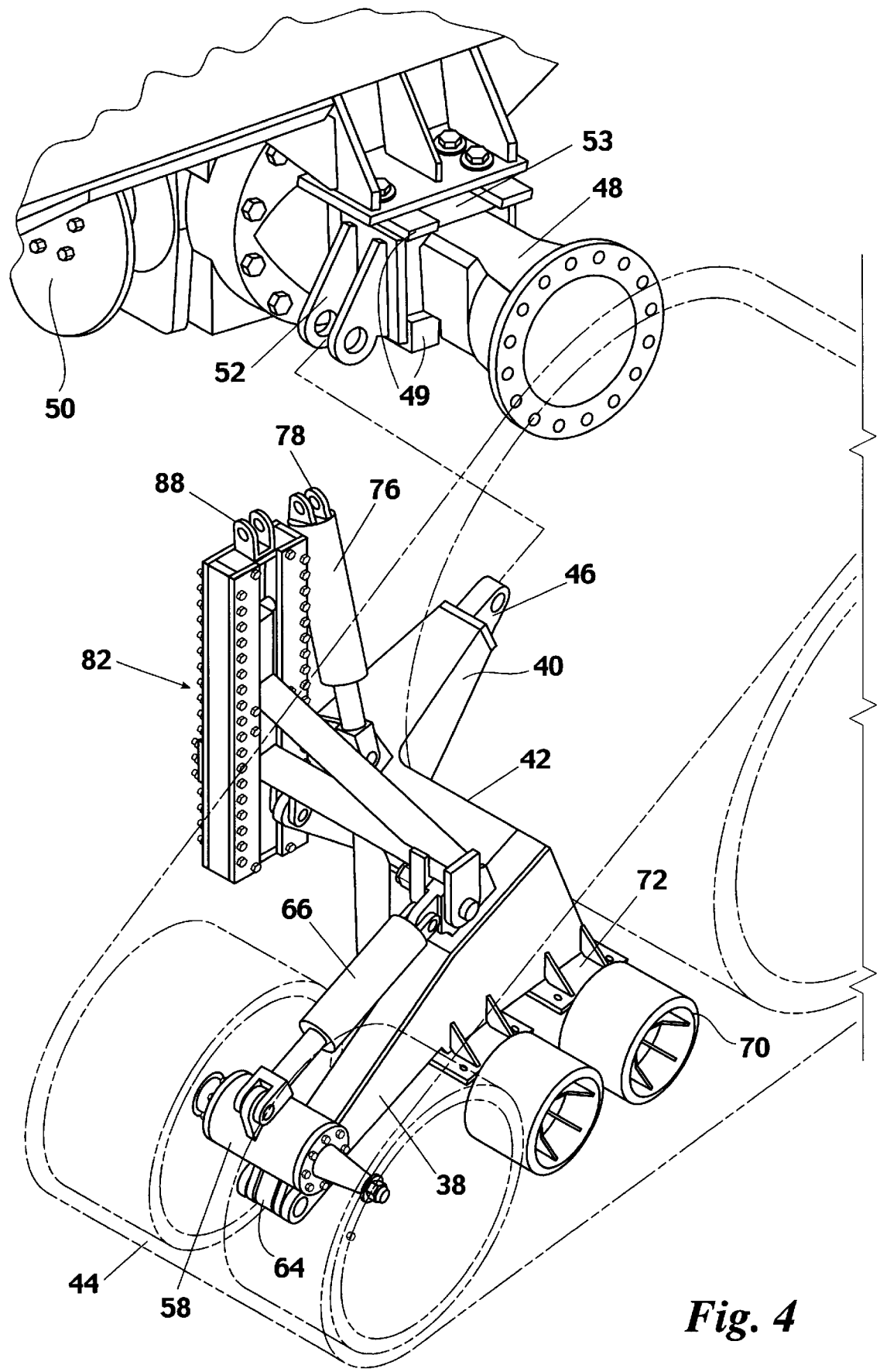
FIG. 4 is a perspective view showing the carriage system components and their interrelation to the vehicle frame and axle.
Figure 5:
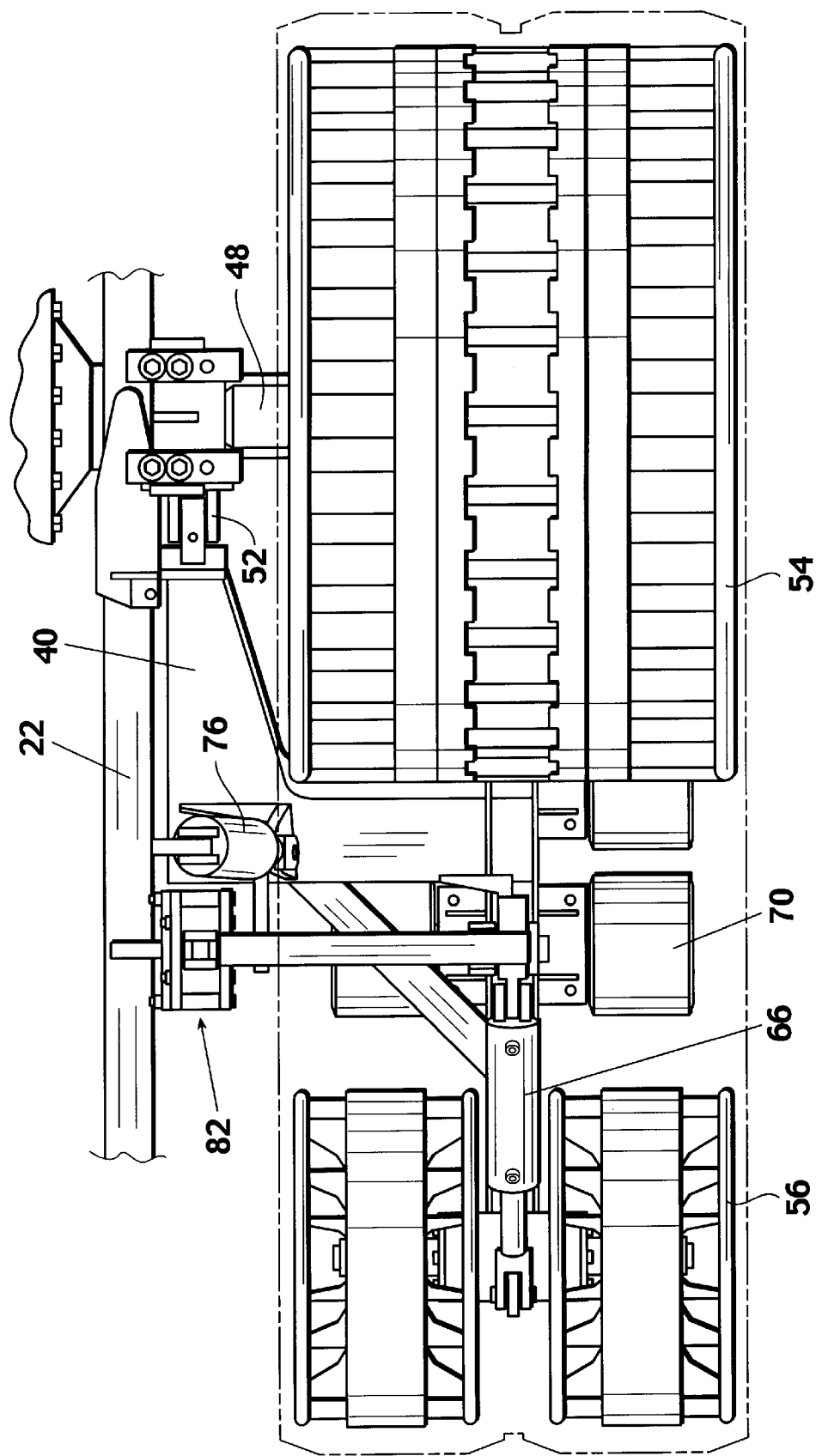
FIG. 5 is a top view of the carriage system.
Figure 6:
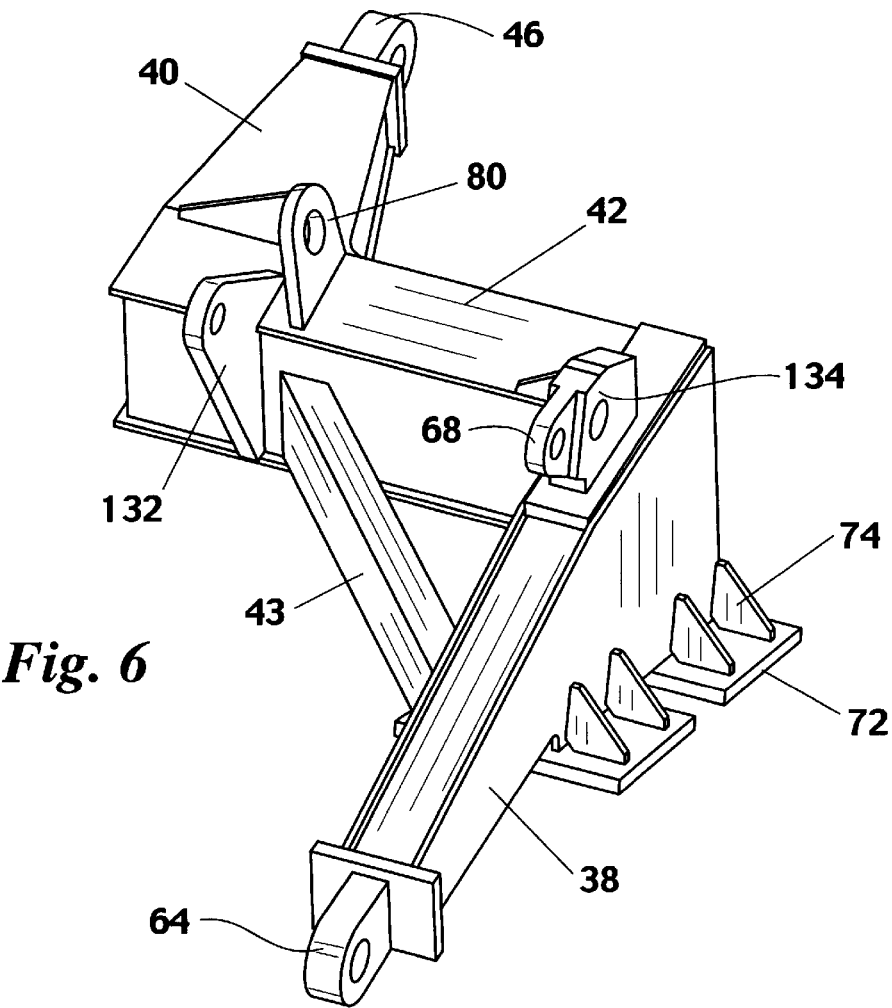
FIG. 6 is a perspective view of the track module frame.

Each track module 30 includes a track module frame 36 which serves to structurally unite the other various components of the module. As best shown in FIGS. 4 and 6, the preferred frame 36 is S-shaped having a front segment 38 and a rear segment 40 connected by a transverse middle segment 42. A diagonal member 43 may be utilized to add support to the structure. The front and rear segments 38, 40 are oriented so as to be substantially parallel to the centerline or axis 44 of the track module 30, and, in fact, the front segment 38 lies on the centerline 44 of the module 30. The rear segment 40 terminates in a rear frame bearing housing 46.

The vehicle frame 22 is supported upon an axle 48 which is driven by a drive train 50 connected to the vehicle power source (not shown). The rear frame bearing housing 46 of the module frame 36 mates with an axle mount weldment 52 affixed adjacent to the axle 48 of the vehicle 20 to achieve, once a bearing (not shown) is inserted, a pivotable connection between the frame 36 and the axle mount weldment 52. In the most preferred embodiment, the axle mount weldment 52 is not welded directly to the axle 48 but is welded to spacers 49 which are bolted to the axle pads 53. This makes for a more reliable connection.

Figure 7:
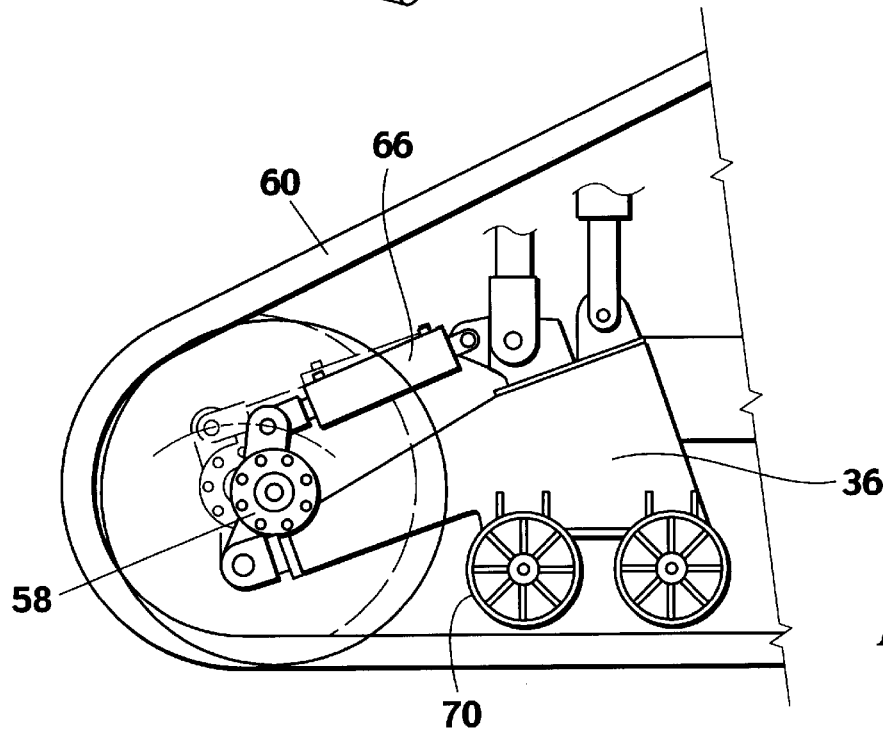
FIG. 7 is a partial side view of the carriage system showing the interrelation of the idler hub and track tension cylinder.

The track module 30 is driven by a large drive wheel 54 mounted to the end of the axle 48 in the normal fashion. If the track module 30 is retro-fitted onto an original tire-equipped vehicle, the drive wheel preferably has the same rolling radius as the original so as to retain the speed and gradability of the original vehicle. At least one, and preferably a pair, of smaller idler wheels 56 are mounted on an idler hub 58 at the forward end of the track module 30. A track belt 60, preferably rubber, surrounds the drive wheel 54 and idler wheels 58. Lugs 62 on the inner surface of the belt 60 engage openings in the drive wheel 54 and between idler wheels 56 so that the belt 60 is securely seated. The preferred track has a width of about 36 inches, a track pitch length of about 270 inches, a track-to-ground contact line of about 65 inches and a track footprint of about 2,350 in.$^2$. The idler hub 58 is pivotably mounted by a bearing (not shown) to a forward frame bearing housing 64 at the terminal end of the forward segment 38 of the module frame 36. A track tension cylinder 66, connected between a bearing housing 68 on the module frame 36 and the idler hub 58, provides appropriate tension to the track. As shown in FIG. 7, the idler hub 58 is pivotable between first and second positions to allow for easy installation and replacement of the belt 60. The belt tension should be about the same as the load on the track module, i.e., ≈20,000 pounds. As need be, the idler wheels 56 may be adjusted to toe-in or toe-out to help prevent track mis-alignment such as might be caused by a variance along the inner diameter of the belt 60. One useful idler wheel steering configuration (not shown) uses two screw-jacks from the module frame 36 to the idler hub 58 as a simple and lightweight mechanism to effect slight changes in the angular orientation of the idler wheels 56. It is also preferred that one or more mid-wheels 70 be affixed to the module frame 36 between the drive wheel 54 and the idler wheels 56, such as by a mounting plate 72 reinforced by gusset 74. In the most preferred embodiment the drive wheel 54 has a diameter of about 56 inches, the idler wheels 56 a diameter of about 26 inches and the mid-wheels 70 a diameter of about 11 inches.

A ground pressure cylinder (GPC) 76 applies a proportionate amount of vehicle weight to the module frame 36. The ground pressure cylinder 76 is adapted for mounting at one end to the vehicle frame 22, such as with a clevis end 78, and at its other end to the module frame 36, and, more particularly, to a GPC bearing housing 80 located upon the transverse segment 42 of the module frame 36. In both locations spherical bearings (as described in more detail below) are used to effectuate the connections. The preferred GPC has a stroke of about ±4.5 inches with built-in hydraulic cushions on both ends. It will be appreciated that, considering the offset between the GPC bearing housing 80 and the centerline 44 of the track module 30, a large twisting moment (couple) is induced upon the module frame 36 when the GPC 76 applies the vehicle weight to the frame. To lessen this torsional force the GPC 76 is positioned far enough forward of the drive wheel 54 so that it can be tilted outboard (preferably about 6 inches) where it connects to the GPC bearing housing 80. This significantly reduces the twisting moment created by the GPC 76.

In addition to the torsional force induced upon the module frame 36 by the GPC 76, the frame 36 also experiences the strain of significant lateral forces encountered when the vehicle is turned. The forces induced upon the module frame 36 are managed by a stabilizer assembly, generally indicated by the reference numeral 82, and, most preferably, a roller stabilizer mechanism. The stabilizer assembly 82 must also, without skidding or binding, account for fore and aft movement of component parts induced by the vertical oscillation of the module frame 36. In the preferred embodiment of the invention, the stabilizer assembly 82 is positioned forward of the GPC 76 to provide more space for the module frame 36. It is also possible to minimize the fore and aft motion at the stabilizer assembly 82 by aligning the points of connection between the GPC 76 and the frame 36 and the stabilizer assembly 82 and the frame 36 with the rear frame bearing housing 46 in more or less the same horizontal plane when the module 30 is in a level ground position. In the most preferred embodiment, the GPC 76 is mounted about 33 inches forward of the centerline of the axle 48 and the stabilizer assembly 82 is positioned about 8 inches forward of the GPC 76. In this configuration, the stabilizer assembly 82 will experience about a 0.60 inches of fore and aft travel assuming ±11 inch vertical oscillation of the frame 36.

Figure 10:
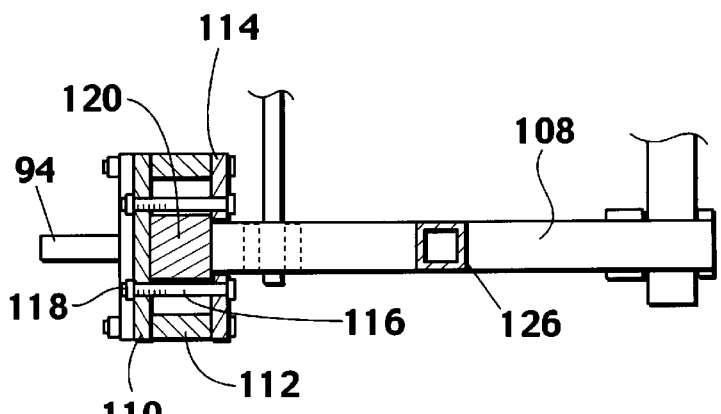
FIG. 10 is a cross section of the preferred stabilizer assembly taken along line 10—10 of FIG. 8.
Figure 11:
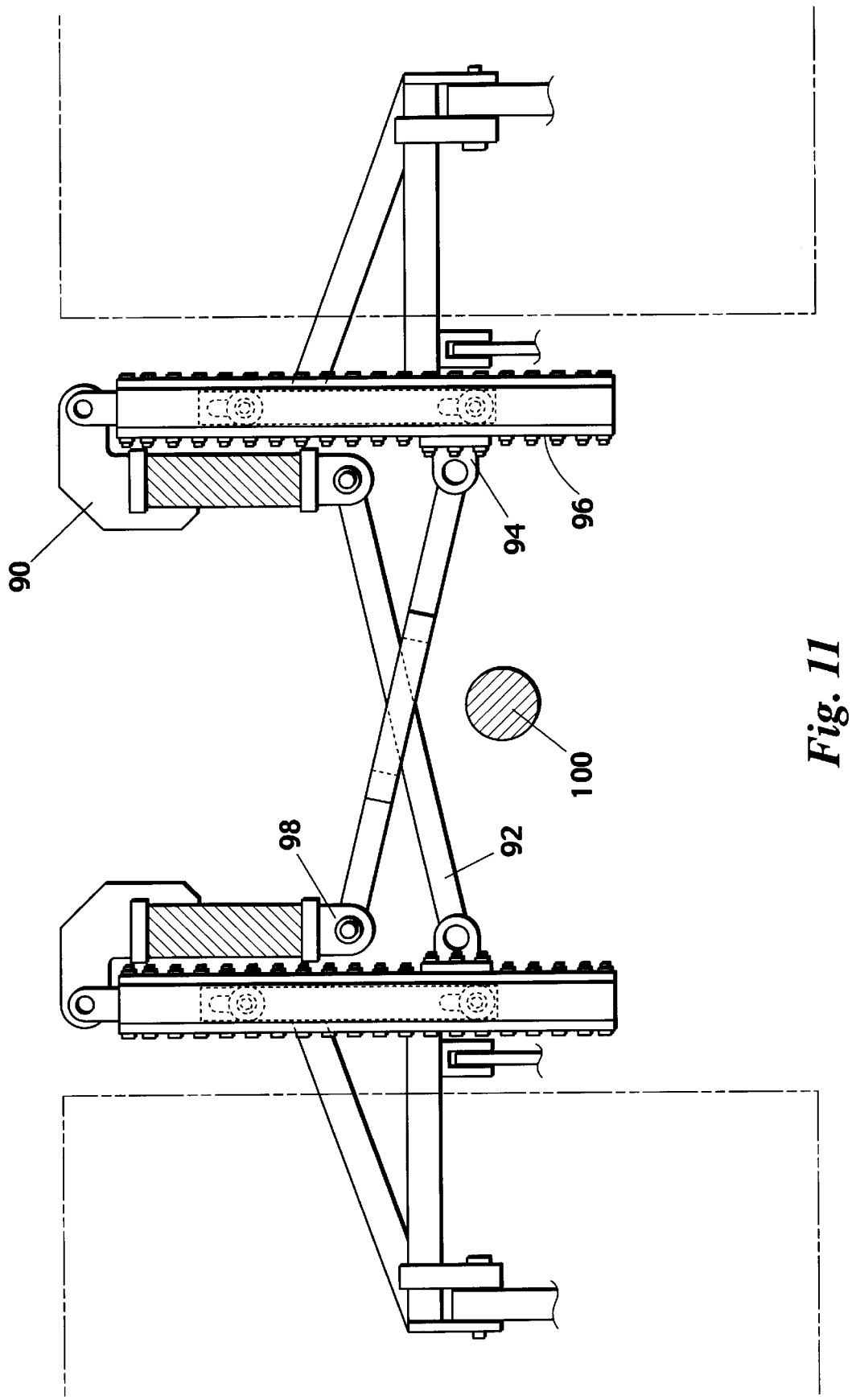
FIG. 11 is an elevational view showing two opposed stabilizer assemblies anchored against lateral movement by the preferred method.

Turning now to FIGS. 3–5 and 8–11, the stabilizer assembly 82 includes an elongate housing 84 vertically mounted at one end, its upper or top end 86, to the vehicle frame 22. In the preferred embodiment, the top end 86 of the housing 84 is provided with a weldment 88 in the form of a clevis end which is adapted to mount to the vehicle frame 22 and, more specifically, to a complementary weldment 90 on the vehicle frame 22. The housing 84 is laterally restrained, preferably by a tie-rod 92 such as illustrated in FIG. 11 where the tie-rod 92 attaches at one end to an eye mount 94 affixed to the back side 96 of the housing 84 and at its other end to a weldment 98 for mounting the tie-rod 92 to the vehicle frame 22 on the side of the vehicle 20 opposite the housing 84. In the most preferred embodiment the laterally restraining tie-rods 92 for respective opposed stabilizer assemblies 82 are mounted in the same vertical plane above the vehicle drive line 100. This is achieved by providing one of the tie-rods with a split body to eliminate interference between the two structural components.

Both the clevis end 88 of the housing 84 and the tie-rod eye mount 94 are conjoined to their complementary mounting structure by spherical bearings (one such bearing is shown generally in FIG. 9 as element 102) possessing the capability to respond axially and radially to force vectors. The bottom end 104 of the housing 84, however, is unattached to any supporting structure. The housing 84 is thus provided with a pendulum-like oscillation ability wherein it is free at its bottom end 104 to move slightly in a fore and aft direction to accommodate vertical oscillation of the module frame 36 as aforedescribed.

The housing 84 has an internal cavity 106 within which an outwardly extending arm 108 is slidably received. The arm 108 is connected at one or more points of connection to the module frame 36 so as to oscillate vertically in tandem with the oscillation of the module frame 36.

In the most preferred embodiment, the housing 84 is a bolted assembly consisting of a bottom plate 110, opposed side plates 112 and opposed top plates 114 affixed together, as best shown in cross-section in FIG. 10, by bolts 116 and nuts 118. The arm 108 is supported for slidable movement within the housing 84 by a vertical bar 120. On each side of the vertical bar 120, the top surface of the bottom plate 110 and bottom surface of the top plates 114 function as hardened races. The vertical bar 120 is provided with two opposed pairs of cam followers (or rollers) 124 which run in the hardened races so as to provide the assembly 82 with the desired vertical oscillation capability. In the most preferred embodiment the stabilizer assembly 82 has a vertical stroke of about ±6 inches. The interior surfaces of the bottom plate 110 and the top plates 114 are preferably hardened to a Brinell hardness of 400–450 in order to resist wear. A bolted assembly such as used in the preferred embodiment makes it easier to heat treat and finish grind the inner surfaces of the housing 84. An acceptable grade of cam followers 124 is a "stud-type" roller having sealed bearings and a capacity rating of 13,300 lbs. force on a 40 $R_c$(Rockwell "c" scale) track. Harder tracks increase load capacity, but are more difficult to manufacture.

The arm 108 thus comprises a roller arm and may be further supported by providing a diagonal tube 126 between the top of the vertical bar 120 and the outermost end of the arm 108. The underside of the roller arm 108 is provided with two mounting weldments 128, 130 which interrelate with two bearing housings 132, 134 provided on the module frame 36. It is preferred that the forward frame bearing housing 64, the tension cylinder bearing housing 68 and the outermost arm bearing housing 134 be axially aligned along the centerline of the carriage system and that the inner and outer arm bearing housings 132, 134 be laterally aligned. Spherical bearings are used to achieve connection between the roller arm 108 and the bearing housings 132, 134 such that the roller arm is capable of withstanding the strong axial and radial forces encountered during operation.

Figure 8:
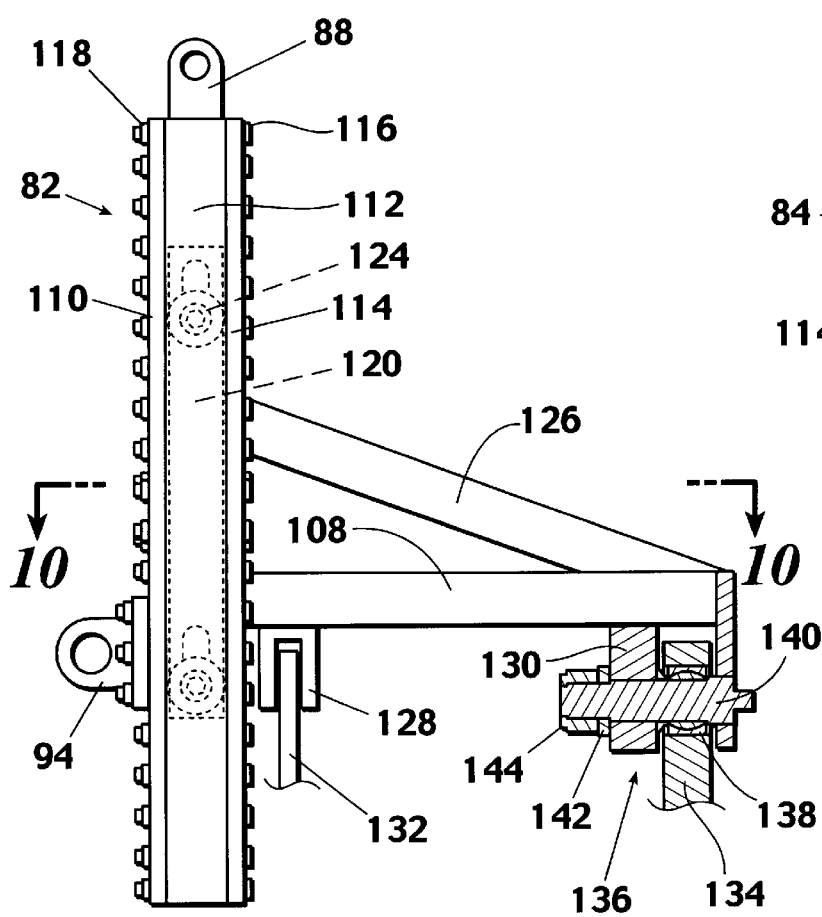
FIG. 8 is an elevational view of the preferred stabilizer assembly.
Figure 9:
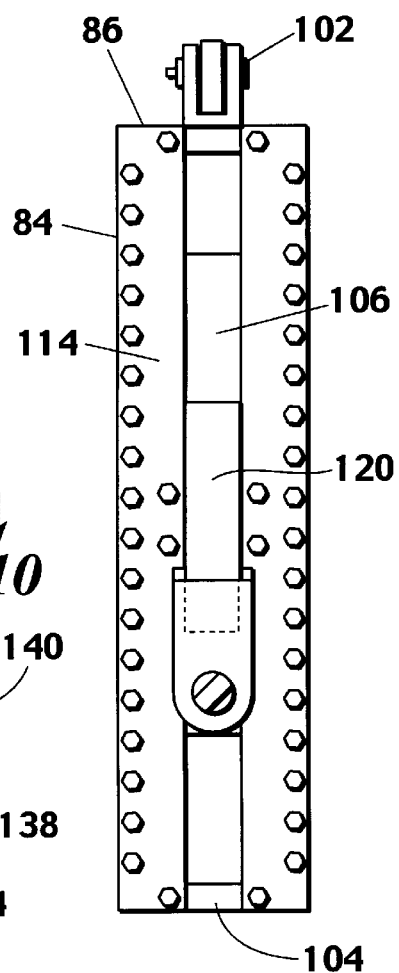
FIG. 9 is another elevational view of the preferred stabilizer assembly.

An exemplar spherical bearing assembly 136 is shown in FIG. 8. The assembly 136 includes a bearing 138 maintained in the bearing housing 134 by a thrust pin 140 held within the mounting weldment 130 by a nut 144 and washer 142. The illustrated spherical bearing assembly 136 is indicative of a type that is acceptable for use where mentioned throughout this specification. While both spherical bearings used in connection with the roller arm 108 need be capable of resisting high radial forces (≈60,000 lbs. force static radial, 15,000 lbs. force dynamic radial), one must also be capable of resisting the high axial load (24,000 lbs) induced upon the arm 108. It is preferred that a larger spherical bearing be used in the outermost bearing housing 134 in order to take on this large axial force.

The preferred stabilizer assembly 82 as detailed above may thus be alternately described as a roller stabilizing mechanism. It functions in a similar manner to a "Pittman arm" of a cycle-mower or a steam engine, converting rotary motion into linear motion. The stabilizer assembly 82 solves the troublesome problem of managing the lateral forces induced upon the module frame 36 while taking into account the fore and aft motion induced by the vertical oscillation of the frame 36. The preferred configuration eliminates the skidding of the rollers 124 within the hardened races such that there are no significant axial forces induced on the rollers 124.

Figure 12:
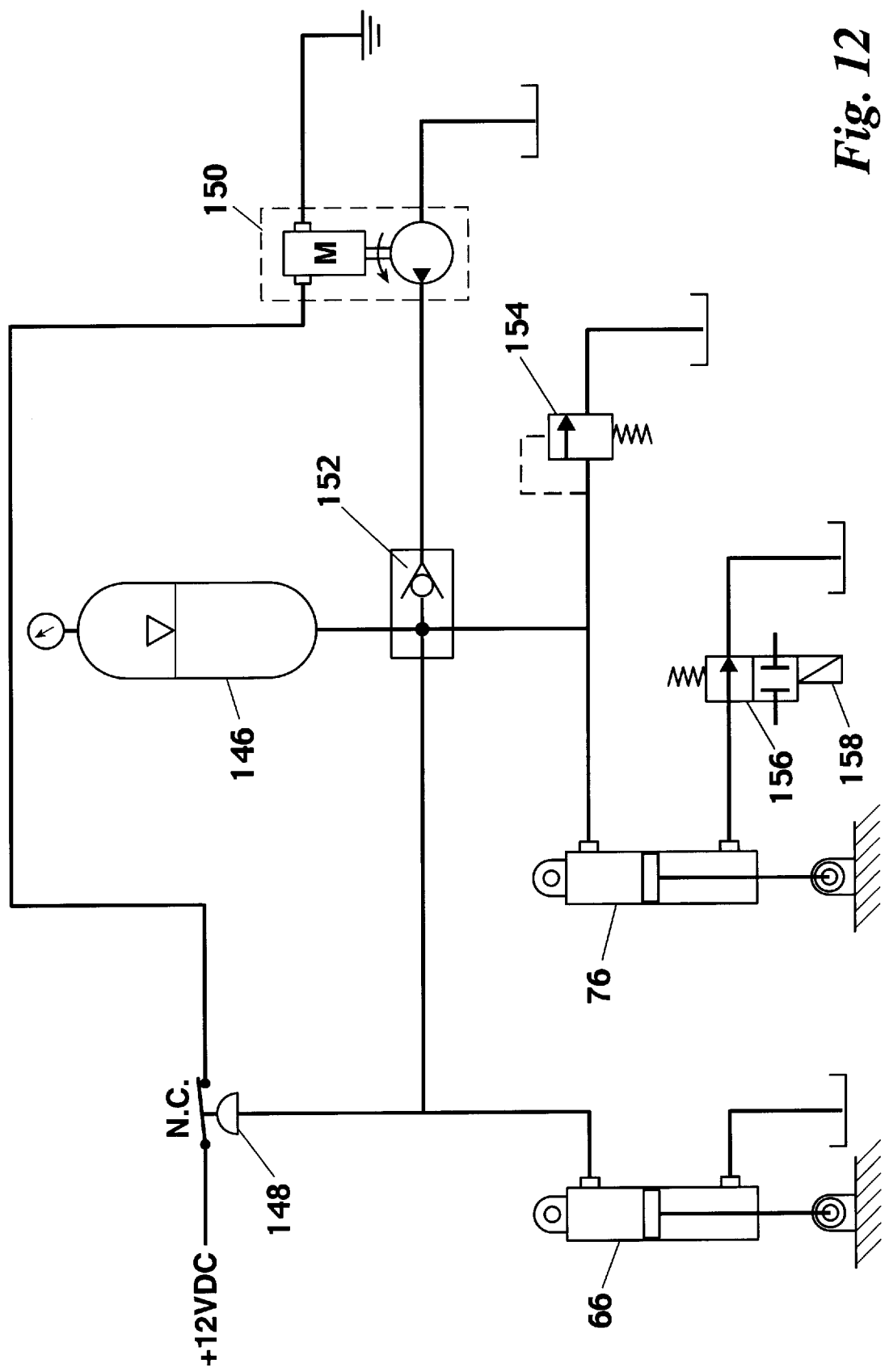
FIG. 12 is a schematic of a ground pressure cylinder/track tension cylinder hydraulic circuit.

Turning now to FIG. 12 for an explanation of the preferred ground pressure cylinder/track tension cylinder hydraulic circuit, it will be seen that the track tension cylinder (TTC) 66 and GPC 76 are hydraulically tied to an accumulator 146 which provides the necessary compliance to allow the TTC 66 and GPC 76 to apply the required forces but also to simultaneously extend and retract as needed as the track follows the ground profile. The accumulator 146 is precharged with nitrogen and contains oil under pressure as regulated by a pressure switch 148 electrically connected to an electric motor-driven pump 150 for providing oil from a tank source (not shown) through a check valve 152 to the accumulator 146. The switch 148 and pump 150 function to maintain the accumulator 146 at the desired average pressure by charging the accumulator 146 to the pressure set at the normally closed switch 148 (generally ~1700 psi). In the preferred embodiment, the TTC 66 and GPC 76 for both right and left track modules of each axle are controlled in parallel to simplify the hydraulic circuit and allow for the individual adjustment of each axle. A high pressure relief valve 154 provides a safety release. All hydraulic lines running to and from the tank source are positioned below the oil level to prevent air infiltration of the hydraulic lines.

A primary requirement of any seismic vibrator is the ability to apply virtually all of the vehicle's weight (through isolation airbags) to hold a vibrating baseplate coupled to the earth. Since the ground pressure cylinders 76 work against this fundamental requirement by extending, the invention provides a means of "disabling" the GPCs 76 during operation of the seismic vibrator when the vehicle is not moving. Still with respect to FIG. 12, a GPC locking valve 156 is provided adjacent to each GPC 76 to lock the GPC 76 in its position just prior to the operation of the seismic vibrating apparatus. The locking valve 156 is normally in an open position, thus allowing for extension and retraction of the GPC 76, but, upon activation of a solenoid 158, the locking valve 156 closes, preventing the further extension of the GPC 76. The solenoid 158 is energized when the "down" solenoid of the vibrating apparatus lift assembly is energized. In this way, as the vibrator baseplate is lowered to the ground and the vehicle's weight is applied to the baseplate, the extension of the GPC 76 is arrested. Thus, the weight of the vehicle is available for baseplate "hold-down" rather than being applied via the GPC 76 as a downward force on the track frame. When the baseplate is raised upon completion of the vibrator's operation, the solenoid 158 is de-energized and the locking valve 156 opens, allowing the GPC 76 to extend and return the vehicle weight to the track frame.

It can accordingly be appreciated that the present invention provides a novel track-type carriage system for heavy vehicles capable of handling the heavy loading and high axle torque generated by large vehicles, such as heavy seismic exploration vehicles. The inventive carriage system readily manages the high torsional and lateral loads experienced by the system and, because it has the capability to vertically oscillate without compromising the stabilizing assembly, the full footprint of the track remains in contact with the ground, even over very rough terrain. In this manner, the objects of the present invention are achieved.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. A carriage system for a heavy vehicle, the vehicle having a vehicle frame and an axle, comprising:
   a track module frame, the frame having a rear end adapted for pivotable connection to the vehicle adjacent the axle to enable a vertical oscillation of the module frame and a forward end;
   a ground pressure cylinder adapted at one end for mounting to the vehicle frame and at the other end mounted to the module frame;
   a drive wheel adapted for mounting to the axle;
   one or more idler wheels mounted to an idler hub affixed to the forward end of the module frame;
   a track belt circumscribing the drive and idler wheels and tensioned by a track tension cylinder connected between the module frame and the idler hub; and
   a stabilizer assembly for managing torsional and lateral forces induced upon the module frame, the assembly including:

an elongate housing vertically mounted at its top end to the vehicle frame and laterally restrained by a tie-rod but free at its bottom end to move slightly in a fore and aft direction to accommodate vertical oscillation of the module frame; and an outwardly extending arm slidably received in the housing and connected at one or more points of connection to the module frame so as to oscillate vertically in tandem with the oscillation of the module frame.

2. The carriage system according to claim 1, wherein the housing is mounted to the vehicle frame and tie-rod with spherical bearing assemblies and wherein each connection between the arm and the module frame is likewise achieved with a spherical bearing assembly.

3. The carriage system according to claim 1, wherein the arm is a roller arm having a plurality of cam followers mounted on a vertical bar and wherein the housing receives the vertical bar and contains hardened races for slidably receiving the cam followers.

4. The carriage system according to claim 3, further comprising a diagonal support affixed at one end to the vertical bar and at the other end to an outward end portion of the roller arm.

5. The carriage system according to claim 1, wherein the arm is connected to the module frame at two points of connection, an outermost point of connection along the centerline of the carriage system and an inner point of connection near the housing.

6. The carriage system according to claim 1, wherein the module frame is S-shaped having forward and rear segments connected by a transverse (as related to the axis of the track module) segment.

7. The carriage system according to claim 6, further comprising one or more mid-wheels positioned between the drive wheel and the idler wheels and wherein the module frame includes a mounting plate affixed to the forward segment of the module frame for receiving each mid-wheel.

8. The carriage system according to claim 6, wherein the module frame includes a rear frame bearing housing at the terminal end of the rear segment of the module frame, a forward frame bearing housing at the terminal end of the forward segment of the module frame, a ground pressure cylinder housing upon the transverse segment of the module frame, a tension cylinder bearing housing upon the forward segment of the module frame, an inner arm bearing housing upon the transverse segment of the module frame and an outer arm bearing housing upon the forward segment of the module frame.

9. The carriage system according to claim 8, wherein the forward frame bearing housing, the tension cylinder bearing housing and the outer arm bearing housing are axially aligned along the centerline of the carriage system.

10. The carriage system according to claim 8, wherein the inner and outer arm bearing housings are laterally aligned.

11. A vehicle possessing the carriage system of claim 1.

12. The vehicle according to claim 11, wherein the vehicle is a seismic exploration vehicle.

13. A seismic exploration vehicle, comprising:

a vehicle frame with articulated steering;

forward and rear axles mounted to the vehicle frame;

a seismic exploration apparatus supported upon the vehicle frame; and a carriage system including two opposed forward track modules and two opposed rear track modules, the track modules each comprising:

a module frame having a rear end pivotally mounted to the vehicle adjacent the axle to enable a vertical oscillation of the module frame and a forward end;

a ground pressure cylinder adapted at one end for mounting to the vehicle frame and at the other end mounted to the module frame;

a drive wheel adapted for mounting to the axle;

one or more idler wheels mounted to an idler hub affixed to the forward end of the module frame;

a track belt circumscribing the drive and idler wheels and tensioned by a track tension cylinder connected between the module frame and the idler hub; and a stabilizer assembly for managing torsional and lateral forces induced upon the track module, the assembly including:

an elongate housing vertically mounted at its top end to the vehicle frame and laterally restrained by a tie-rod but free at its bottom end to move slightly in a fore and aft direction to accommodate vertical oscillation of the module frame; and an outwardly extending arm slidably received in the housing and connected at one or more points of connection to the module frame so as to oscillate vertically in tandem with the oscillation of the module frame.

14. The seismic exploration vehicle according to claim 13, wherein each tie-rod is connected at one end to the back of the stabilizer assembly and at the other end to the opposite side of the vehicle frame and wherein the tie-rods which laterally restrain the stabilizer assemblies for opposing track modules lay in the same vertical plane.

15. The carriage system according to claim 13, wherein the housing is mounted to the vehicle frame and tie-rod with spherical bearing assemblies and wherein each connection between the arm and the module frame is likewise achieved with a spherical bearing assembly.

16. The carriage system according to claim 13, wherein the arm is a roller arm having a plurality of cam followers mounted on a vertical bar and wherein the housing receives the vertical bar and contains hardened races for slidably receiving the cam followers.

17. The carriage system according to claim 16, further comprising a diagonal support affixed at one end to the vertical bar and at the other end to an outward end portion of the roller arm.

18. The carriage system according to claim 13, wherein the arm is connected to the module frame at two points of connection, an outermost point of connection along the centerline of the track module and an inner point of connection near the housing.

19. The carriage system according to claim 13, wherein the module frame is S-shaped having forward and rear segments connected by a transverse (as related to the axis of the track module) segment.

20. The carriage system according to claim 19, further comprising one or more mid-wheels positioned between the drive wheel and the idler wheels and wherein the module frame includes a mounting plate affixed to the forward segment of the module frame for receiving each mid-wheel.

* * * * *